Oct. 11, 1966  R. GOODMAN  3,277,737
DEVICE FOR TRANSLATING ROTARY MOTION INTO LINEAR MOTION
Filed Dec. 22, 1964
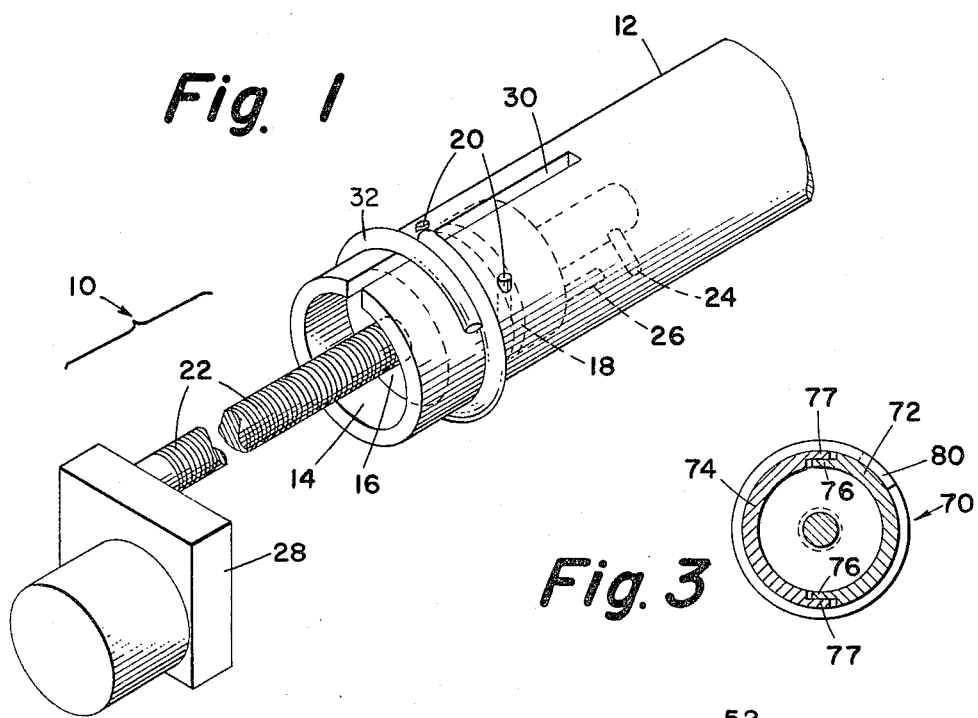
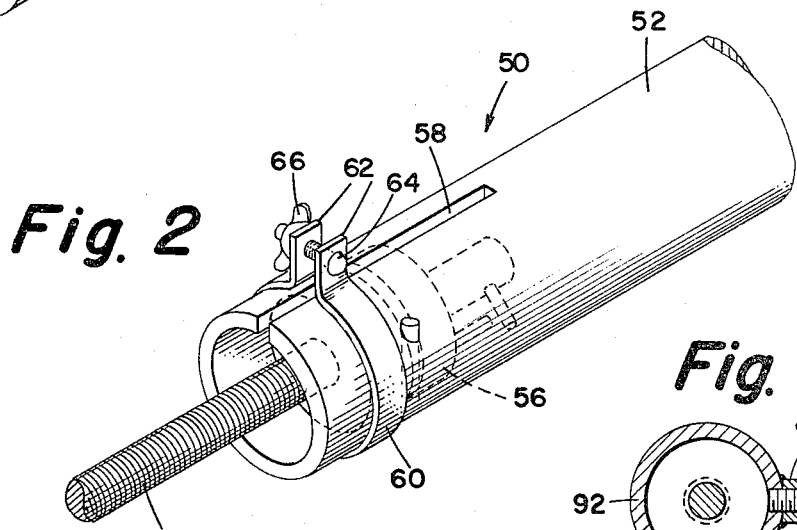
INVENTOR.
ROBERT GOODMAN
BY
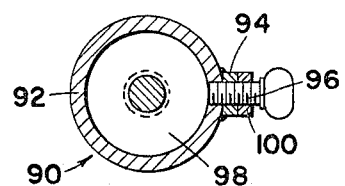
ATTORNEY United States Patent Office 3,277,737
Patented Oct. 11, 1966

3,277,737
DEVICE FOR TRANSLATING ROTARY MOTION
INTO LINEAR MOTION
Robert Goodman, 5325 Westminster Ave.,
Philadelphia, Pa.
Filed Dec. 22, 1964, Ser. No. 420,368
7 Claims. (Cl. 74—424.8)

This invention relates to a nut and screw assembly for translating rotary motion into linear motion, and it more particularly relates to an assembly of this type wherein the linear motion is automatically halted after a predetermined linear movement has been effected.

This application is a continuation-in-part of application Serial No. 385,435, filed July 27, 1964.

As was explained in the aforementioned parent application, the present invention obviates the use of clutch mechanisms or the like which had previously been required in order to prevent jamming of the nut and screw when the linear movement of one of the parts reached a predetermined limit. It also obviates the use of overrunning screw and nut mechanisms wherein it was necessary to utilize ball bearing assemblies including helical ball races on the inside of the nut and additional ball retainers.

The defects and disadvantages of the prior art were overcome by the invention set forth in the said parent application by providing a tubular shaft having a nut with a low coefficient of friction therein. This nut is internally threaded to receive a screw-threaded shaft and is externally provided with means to retain it against longitudinal movement relative to the tubular shaft. In one embodiment, these external means comprise a pair of roll pins tangentially positioned in an outer peripheral groove on the nut and extending through corresponding apertures in the tubular shaft. In the operation of this mechanism, the nut is held in frictional engagement with the tube wall while the threaded shaft moves axially thereof as it rotates until a lateral projection on the threaded shaft engages a corresponding projection on the nut, at which time, a continued rotation of the threaded shaft in the same direction exerts a corresponding rotational force on the nut sufficient to overcome the frictional retaining force of the mating nut and tube peripheries and of the roll pins 20. The nut then rotates relative to the tubular shaft, thereby halting any further axial movement of the threaded shaft.

However, it has now been found that after a sufficient amount of use, the outer periphery of the nut tends to wear. Because the tolerances must be very close in order to provide for frictional engagement between the nut and tube wall while the threaded shaft is being threaded through the nut, even the smallest amount of peripheral wear might disrupt the effective operation of the mechanism.

It is, therefore, one object of the present invention to overcome the problem of undesirable wear of the outer surface of the nut through continued use by providing means to compensate for such wear so that the device remains operative for substantially greater periods of time than previously possible.

Another object of the present invention is to provide an improvement of the aforesaid type whereby the basic structure, ease of manufacture and cost of the mechanism remains substantially the same.

Other objects and many of the attendant advantages of this invention will be readily appreciated as the same becomes better understood by reference to the following description when read in conjunction with the accompanying drawings wherein:

FIG. 1 is a fragmentary perspective view of one embodiment of the invention.

FIG. 2 is a fragmentary perspective view of a second embodiment of the invention.

FIG. 3 is a cross-sectional view of a modified form of the invention.

FIG. 4 is a cross-sectional view of another modified form of the invention.

Referring now in greater detail to the various figures of the drawing wherein similar reference characters refer to similar parts, there is shown, in FIG. 1, an assembly generally designated 10, comprising a hollow, tubular shaft 12, having means at one end (not shown) for pivotally connecting it to a member to be actuated and being open at the other end, as shown at 14.

Within the tubular shaft 12 is a nut 16, preferably constructed of a self-lubricating plastic such as "Delrin" (an acetal resin produced by Du Pont and having a low coefficient of friction). This nut 16 is of a diameter to snugly fit within the tube 12 with sufficient frictional engagement to normally prevent rotation of the nut relative to the tube. There is sufficient friction to prevent the relative rotation despite the low coefficient of friction of the material of the nut because of the relatively large surface area of the periphery of the nut compared to the fine threads on its interior. However, this frictional engagement may be overcome when the rotational force exerted on the nut is of sufficient intensity.

The outer periphery of the nut 16 is provided with an annular groove 18. Tangentially positioned in this groove are two oppositely-disposed roll pins 20, the opposite ends of which project through corresponding apertures in the tubular shaft 12.

The nut 16 is threadedly engaged with a threaded shaft 22 having a lateral pin 24 rotatably engageable with an axial pin 26 extending from the nut 16. The opposite end of the threaded shaft 22 is operatively connected to an electric motor 28 of standard design.

All of the above-described structure is identical to that disclosed in applicant's aforesaid parent application. However, in the present mechanism, the tubular shaft 12 is split or slotted at 30 in the area where the nut 16 is located. Since the tubular shaft 12 is constructed of metal or similar material which has a certain degree of springiness or flexibility when subjected to sufficient pressure, the slot 30 permits the tube 12 to compress and expand for the width of the slot.

An annular spring strip or ring 32 encircles the tube 12 at the area of the nut and traverses the slot 30. This spring ring 32 tends to compress the material of the tube 12 into slot closing position but the slot is held open by the nut 16. However, any wear on the outer periphery of the nut which decreases its outer diameter is automatically compensated by the spring ring 32 so that the frictional engagement between the nut and the tube remains constant.

Although one slot 30 is illustrated as the preferred embodiment of the invention, it is within the scope of the invention to provide a plurality of such slots. This would increase the elasticity of the tube but would somewhat weaken the tube at that area.

A modified form of the invention is illustrated in FIG. 2. In this form of the invention which comprises the assembly generally designated 50, the tubular shaft 52, threaded shaft 54, nut 56 and all their associated elements are identical to the corresponding parts of the mechanism of FIG. 1. This is also true of the slot 58. However, instead of the spring ring 32, there is provided a split collar 60 having upstanding ears 62 apertured to receive a bolt 64. A nut 66, here illustrated as a wing type nut, is mounted on the bolt to clamp the ears 62 of the collar in adjustable positions.

In the form of the invention shown in FIG. 2, the compensation of the tube diameter for wear is not automatic as in the form of FIG. 1 but is manually adjustable by rotation of the nut 66. Although this eliminates the automatic adjustment feature, it permits the frictional engagement between the nut 56 and the tube 52 to be varied, so that if there is normally too much friction or not enough friction between the nut and tube because of errors in manufacture, this can be easily compensated by tightening or loosening the nut 66.

In FIG. 3, there is shown another form of the invention, generally designated 70, wherein instead of a unitary tubular shaft, the tubular shaft comprises two sections 72 and 74. Each of these sections is substantially of semi-annular shape, but the section 72 is provided with stepped upper and lower edges forming flanges 76 while the section 74 is provided with similar stepped edges forming complementary flanges 77. This stepped construction permits radial adjustment of the sections to increase or decrease the effective diameter of the tubular shaft and thereby permits variation of the frictional engagement between the nut 78 and the tubular shaft. A spring ring 80 retains the sections together.

In FIG. 4, there is provided another form of the invention, generally designated 90, wherein the tubular shaft 92 is provided with a base 94 which is internally screw-threaded to receive a screw 96. This screw 96 is adapted to frictionally bear on the nut 98, and this friction can be adjusted by turning the screw one way or the other.

Obviously, many modifications of the present invention are possible in the light of the above teachings. It is, therefore, to be understood that within the scope of the appended claims, the invention may be practiced otherwise than as specifically described.

The invention claimed is:

1. A mechanical movement device comprising a first shaft and a second shaft, said shafts being operatively connected for axial movement relative to each other, the first shaft being screw-threaded and the second shaft being held against rotation and having a nut threadedly engaged with said first shaft, said nut being axially fixed relative to said second shaft, restraining means normally holding said nut rotationally fixed relative to second shaft whereby relative rotation between said first shaft and said nut provides relative axial movement between said first and second shafts, and means for overcoming said restraining means upon predetermined axial movement of said shafts relative to each other, the overcoming of said restraining means causing said nut to rotate with said first shaft relative to said second shaft to discontinue relative axial movement of said shafts, said second shaft being hollow and said nut being positioned therein with its outer periphery in close fit with the inner periphery of the hollow shaft, said close fit providing frictional engagement, said frictional engagement comprising said restraining means, and means for varying the frictional engagement between said nut and said second shaft.

2. The device of claim 1 wherein said hollow shaft is constructed of deformable material and includes at least one longitudinal slot extending from one end thereof, said slot overlying said nut, said means for varying the frictional engagement between said nut and said second shaft comprising slot-closing means on said hollow shaft for urging the material of said hollow shaft into slot closing position.

3. The device of claim 2 wherein said slot-closing means comprises an annular clamping means which encompasses said hollow shaft and traverses said slot.

4. The device of claim 2 wherein said slot-closing means comprises a spring ring which encircles said hollow shaft transversely of said slot.

5. The device of claim 2 wherein said slot-closing means comprises a split collar which encircles said hollow shaft transversely of said slot, said collar having ends spaced from each other and secured to each other by adjustable holding means.

6. The device of claim 1 wherein said hollow shaft comprises two opposed substantially semi-annular sections movable toward and away from each other to vary said frictional engagement.

7. The device of claim 1 wherein said hollow shaft is provided with an adjustable screw, said screw bearing on said nut to provide said frictional engagement.

References Cited by the Examiner

UNITED STATES PATENTS

| | | | |
|---|---|---|---|
| 525,780 | 9/1894 | Boynton | 74—424.8 |
| 995,478 | 6/1911 | Nelson | 74—424.8 X |
| 1,066,817 | 7/1913 | Holt et al. | 74—424.8 X |

DAVID J. WILLIAMOWSKY, *Primary Examiner.*

L. H. GERIN, *Assistant Examiner.*